United States Patent [19]

Moriarty

[11] Patent Number: 4,986,377
[45] Date of Patent: * Jan. 22, 1991

[54] BELTED CRAWLER HAVING AUXILIARY DRIVE

[75] Inventor: Kevin J. Moriarty, Davenport, Iowa

[73] Assignee: Deere & Company, Moline, Ill.

[ * ] Notice: The portion of the term of this patent subsequent to Jul. 24, 2007 has been disclaimed.

[21] Appl. No.: 376,732

[22] Filed: Jul. 7, 1989

Related U.S. Application Data

[63] Continuation-in-part of Ser. No. 169,528, Mar. 17, 1988, Pat. No. 4,942,934.

[51] Int. Cl.$^5$ .................. B62D 11/04; B62D 55/04
[52] U.S. Cl. ............................... 180/6.5; 180/6.7; 180/9.1
[58] Field of Search ............... 180/6.48, 6.5, 243, 180/242, 6.2, 6.7, 233, 9.1

[56] References Cited

U.S. PATENT DOCUMENTS

| | | |
|---|---|---|
| 4,177,879 | 12/1979 | Henn . |
| 4,183,419 | 1/1980 | Henn et al. . |
| 4,186,816 | 2/1980 | Pfundstein . |
| 4,240,534 | 12/1980 | Hedgcock et al. . |
| 4,434,680 | 3/1984 | Riediger et al. . |
| 4,519,465 | 5/1985 | Triplett . |
| 4,546,844 | 10/1985 | Stauffer . |
| 4,560,018 | 12/1985 | Satzler . |
| 4,605,084 | 8/1986 | Haynes et al. .......... 180/233 |
| 4,635,743 | 1/1987 | Riehl . |
| 4,678,244 | 7/1987 | Furuta et al. . |

FOREIGN PATENT DOCUMENTS

| | | |
|---|---|---|
| 526872 | 5/1931 | Fed. Rep. of Germany . |
| 3246208 | 6/1984 | Fed. Rep. of Germany . |

OTHER PUBLICATIONS

LeTourneau, "30 Reasons Why the L-700 Is the Best Large Loader In the World", Advertising Brochure, R. G. LeTourneau, Inc., P.O. Box 2307, Longview, Tex. 75601.

Primary Examiner—Charles A. Marmor
Assistant Examiner—Karin Tyson

[57] ABSTRACT

The invention is directed to an auxiliary drive system for the front wheels of a belted track crawler. The auxiliary drive wheels and the main drive wheels are provided with overrunning clutches. In the first two embodiments a mechanical system is used to drive the auxiliary wheels. In the third embodiment electric motors are used to drive the auxiliary wheels. With all the systems when the crawler is being driven forward the auxiliary drive wheel is driven slower than the main drive wheel. In a no slip situation the auxiliary drive wheel freely rotates at the speed of the main drive wheel. When sufficient slippage occurs between the main drive wheel and the track, the auxiliary drive wheel is driven at the slower speed driving the track. In reverse, the auxiliary drive wheel is driven faster than the main drive wheel. In a no slip condition, the auxiliary drive wheel drives the crawler in reverse. When sufficient slippage occurs between the auxiliary drive wheel and the belted track, the main drive wheel again drives the crawler.

35 Claims, 3 Drawing Sheets

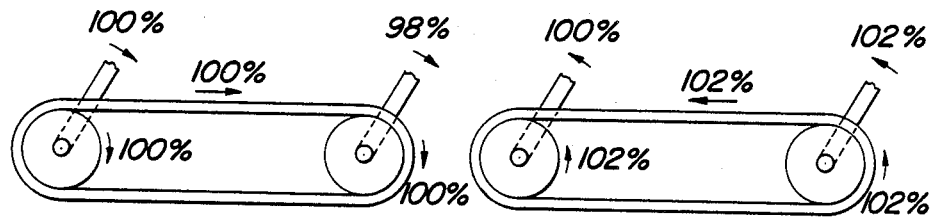
FIG. 3a  FIG. 3b
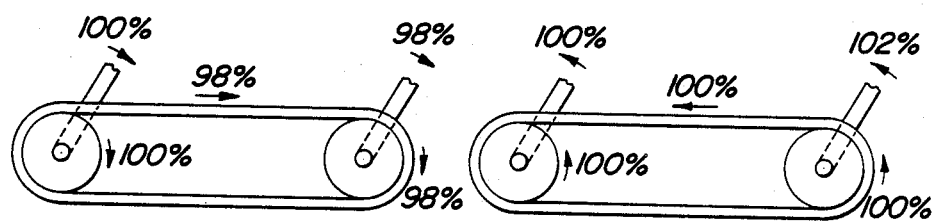
FIG. 3c  FIG. 3d
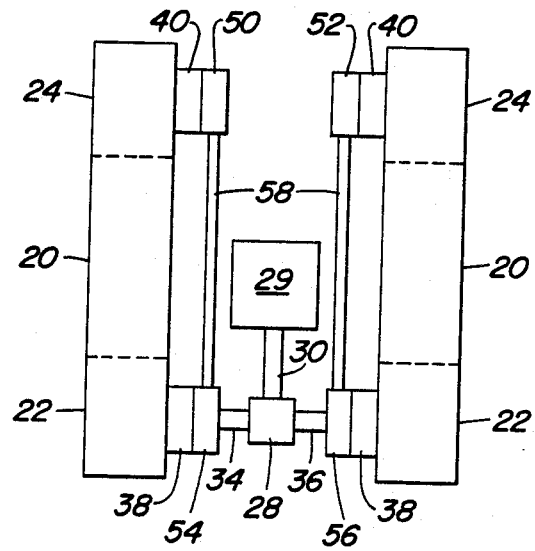
FIG. 4

BELTED CRAWLER HAVING AUXILIARY DRIVE

CROSS REFERENCE WITH PRIOR APPLICATIONS

This application is a continuation-in-part of U.S. patent application Ser. No. 07/169,528, filed Mar. 17 1988, now U.S. Pat. No. 4,942,934.

BACKGROUND OF THE INVENTION

1. Field of the Invention

The invention is directed to a friction driven belted crawler having main drive wheels located at the rear of the crawler and auxiliary drive wheels located at the front of the crawler. The auxiliary drive wheels are driven at a percentage of the speed of the main drive wheels.

2. Description of the Prior Art

Conventional crawlers are well known and are typically provided with a steel segmented track consisting of steel track shoes that are mounted to a steel track chain. The track chain is positively driven by a drive sprocket which is coupled through a transmission to an internal combustion engine.

It has long been proposed to form endless belted tracks from elastomeric material. Such tracks have a number of advantages, one such advantage is that the belted tracks permit a crawler to drive over streets and curbs without ripping up streets or curbs with the steel grousers of conventional tracks. Two belted track systems are currently being used on construction and agricultural machines. In one design marketed by Bridgestone Co., Ltd., Tokyo, Japan, the track is provided with a series of apertures through which a toothed drive sprocket engages the track for positively driving the track. Each of the apertures is reinforced by a steel insert mounted in the track, see U.S. Pat. No. 4,678,244. The second system is currently being marketed by Caterpillar Tractor Co., Peoria, Ill., on an agricultural tractor, see PCT Application WO85/02824. With this track system, the belted track engages a rubber coated main drive wheel located at the rear of the crawler and a pneumatic tire idler wheel located at the front of the tractor. With a belted track system slippage may occur between the main drive wheel and the belted track. As such, the belted track is put under great tension to reduce slippage.

Friction driven belted tracks, such as that on the Caterpillar Tractor Co. agricultural tractor, do not provide comparable performance capabilities in the forward and reverse directions. In the forward direction, the minimum tension in the belt occurs on the top portion of the belted track, and the maximum tension occurs in the lower portion of the belt as it contacts the drive wheel. In the reverse direction, the opposite is true and the maximum tension occurs in the top portion of the belt, and the minimum tension occurs in the belt at its lower contact with the drive wheel. Therefore, the tractor has greater forward thrust than reverse thrust.

The maximum thrust potential of this track system is proportional to the track static pretension. Therefore, with a large heavy vehicle, it is necessary to keep the tracks highly tensioned to provide adequate reverse thrust. Higher pretension loading of the track necessitates increasing the frame structure of the track undercarriage to withstand high tension loadings.

One method of providing more comparable performance characteristics in both the forward and reverse directions is to drive all four wheels of the track. U.S. Pat. No. 4,560,018, to Satzler, discloses using a tandem drive mechanism to drive jointless elastomeric belt. This proposed mechanism delivers greater torque to the rear wheel assembly than the front wheel assembly.

Six wheel drive motor graders are being marketed by Deere & Company, Moline, Ill., the assignee of the present patent application, and Dresser Industries, Inc., Houston, Tex., wherein hydraulic wheels motors are used to drive the front wheels at a percentage of the speed of the tandem drive wheels, see U.S. Pat. Nos. 4,177,870, 4,183,419 and 4,186,816 to Deere & Company, and 4,546,844 and 4,635,793 to Dresser Industries. With these systems an electronic controller having wheel speed sensors automatically drives the front wheels at a preselected percentage of the speed of the rear main drive wheels. The front wheels are either driven in a normal mode at 97–99% of the speed of the main drive wheels; or in an aggressive mode at 101–103% of the speed of the main drive wheels. In the normal mode, the front wheels only become engaged when the rear wheels are slipping. In the aggressive mode, the front wheels are constantly trying to pull the machine.

SUMMARY OF THE INVENTION

The present invention provides a system for driving the front wheels of a friction driven belted crawler at a percentage of the speed of the main rear drive wheels. The front wheels thereby becoming auxiliary drive wheels.

In a first embodiment, an internal combustion engine provides a power input to a transmission. The transmission has a first output for driving the main drive wheels. An overrunning clutch is operatively positioned between each of the two main drive wheels and the first output of the transmission. The overrunning clutches of the main drive wheels only overrun when the crawler is being driven in reverse and not when the crawler is being driven forward.

The transmission is provided with a second output which drives the front auxiliary drive wheels. The second output is coupled to a two-speed gear box for adjusting the output speed of the transmission so that the front wheels are driven at a percentage of the speed of the main drive wheels.

The auxiliary drive wheels are also provided with overrunning clutches operatively located between the auxiliary drive wheels and the two-speed gear box. The overrunning clutches of the auxiliary drive wheels only overrun when the crawler is being driven in the forward direction.

The two-speed gear box is automatically shifted whenever the operator shifts the direction of the transmission from forward-to-reverse, or reverse-to-forward. When the crawler is being driven in forward, the two-speed gearbox drives the auxiliary drive wheels at a speed slower than the speed of the main drive wheels. In reverse, the two-speed gearbox drives the front drive wheels faster than the speed of the main drive wheels. For example, the front drive wheels may be driven at 98% of the speed of the main drive wheels when driving the crawler forward, and driven at 102% of the speed of the main drive wheels when the crawler is being driven in reverse. Therefore, when the crawler is being driven in the forward direction the main drive wheels speed is 100% whereas the two-speed gear box drives the auxiliary drive wheels at 98% the main drive wheels speed. Although the front auxiliary drive wheel is being driven at 98% the speed of the main drive wheel, it rotates at the same speed of the main drive wheel because the front wheel is overrunning the drive input by the overrunning clutch. If the main drive wheels begin to slip in relation to the belted track the auxiliary drive wheel will no longer overrun the drive input and will start to engage the belted track and pull the crawler.

When the crawler is being driven in the reverse direction the auxiliary drive wheel may be driven at 102% the speed the main drive wheel. The main drive wheel therefore overruns the main drive input and rotates at 102%. If the auxiliary drive wheel begins to slip in relation to the belted track, the main drive wheel will no longer overrun the main drive wheel input and will start to pull the vehicle at 100% speed.

The second embodiment is similar to the first embodiment in that both of the main drive wheels are provided with overrunning clutches that only overrun in reverse, and the auxiliary drive wheels are provided with overrunning clutches that only overrun in forward. The two-speed gearbox has been replaced with two-speed final drives located at each of the front auxiliary drive wheels. These final drive units are shifted to drive the front auxiliary drive wheels slightly faster or slower than the main drive wheels. Like the two-speed gear box, the two-speed final drives are automatically shifted as the crawler is shifted from forward-to-reverse, or reverse-to-forward.

The third embodiment uses electric motors to drive the front auxiliary drive wheels. The electric motors are coupled to an electronic controller for controlling the speed of the motors. The electronic controller has a speed sensor for sensing the speed of the main drive wheels. The electronic controller in response to a main drive wheel speed signal and a signal indicating the driving direction of the crawler drives the electric motors at the proper speed and in the proper direction. Both of the auxiliary drive wheels and the main drive wheels are provided with overrunning clutches as with the first two embodiments.

One modification of the third embodiment would include belted track speed sensor for sensing the speed of the track. In this way the electric motors would only have to be triggered when slippage between the track and the main drive wheels is detected.

BRIEF DESCRIPTION OF THE DRAWINGS

FIGS. 3a, 3b, 3c and 3d illustrate the operation of the crawler.

FIG. 4 is a schematic of the second embodiment of the invention.

DETAILED DESCRIPTION

Figure 1:
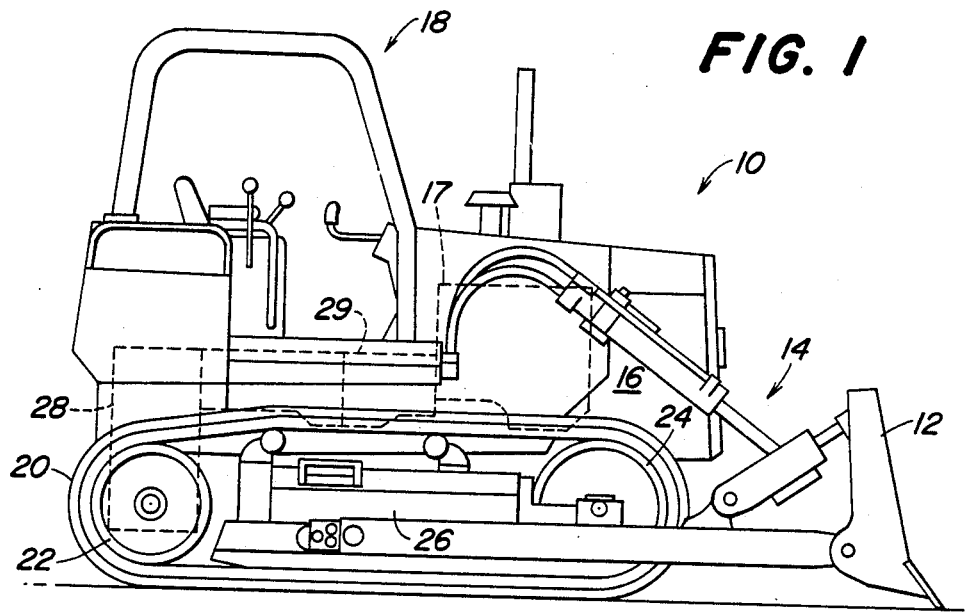
FIG. 1 is a side view of a crawler having jointless elastomeric belted tracks.

FIG. 1 illustrates a crawler 10 which is provided with bulldozer blade 12 which is suitably coupled to the crawler by linkage 14. The vehicle is provided with frame 16 which houses internal combustion engine 17 (shown in phantom lines) and defines operator's station 18. The vehicle is driven by an elastomeric belted track 20 which operatively engages rear main drive wheel 22 and front auxiliary drive wheel 24. The belted track is tensioned by tension and recoil assembly 26. The belted track is provided with centering guide lugs for guiding the track across the drive wheels, and grousers for frictionally engaging the ground.

The main drive wheels are operatively coupled to a steering system 28 (shown in phantom lines) which is in turn coupled to transmission 29. The transmission is operatively coupled to the output of internal combustion engine 17. The steering system maybe of any conventional design and maybe a clutch/brake system, hydrostatic, or differential steer. The transmission may be a power shift transmission having various clutches and brakes that are actuated in response to the operator positioning a shift control lever located in operator's station 18.

First Embodiment

Figure 2:
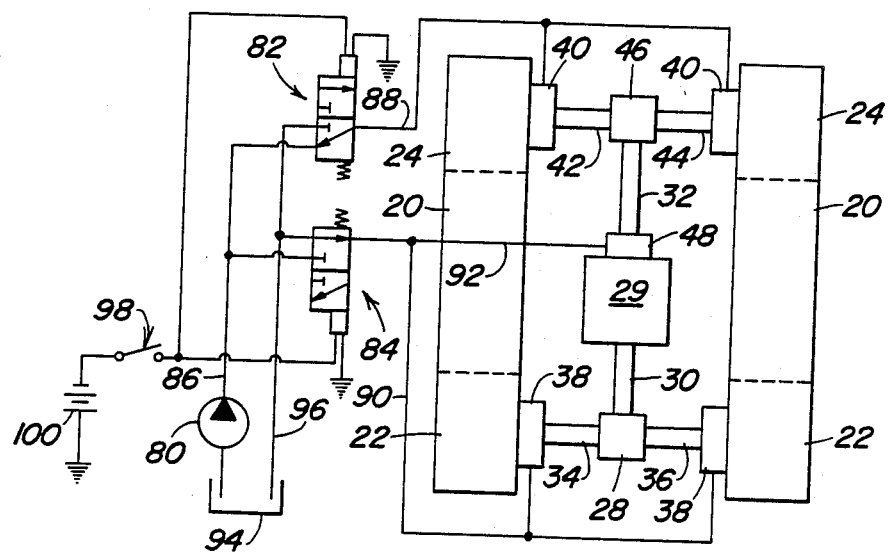
FIG. 2 is a schematic of the first embodiment of the invention.

FIG. 2 illustrates the first embodiment of the present crawler drive system. In this embodiment transmission 29 is provided with a first output comprising main drive shaft 30 and a second output comprising auxiliary drive shaft 32. The main drive shaft 30 is coupled to main steering system 28 which controls the output to left and right drive inputs comprising shafts 34 and 36, respectively. Drive shafts 34 and 36 are operatively connected to left and right main overrunning clutches 38. Main overrunning clutches 38 drive main drive wheels 22.

The auxiliary drive wheels 24 are provided with auxiliary overrunning clutches 40 which are operatively coupled to left and right drive inputs comprising drive shafts 42 and 44, respectively. As with the main drive system, drive shafts 42 and 44 are coupled to auxiliary steering system 46 for controlling the output to the auxiliary drive wheels. Auxiliary steering system 46 is operatively coupled to auxiliary drive shaft 32. Auxiliary drive shaft 32 is operatively coupled to transmission 29 by means of two-speed gear box 48. The two-speed gear box can be shifted to drive the auxiliary drive wheels at 98% the speed of the main drive wheels in forward, or 102% the speed of the main drive wheels in reverse.

The four overrunning clutches can be similar to the type disclosed in U.S. Pat. No. 4,546,844, which is incorporated herein by reference. With this overrunning clutch the wheel is free to rotate faster than the drive input similar to a bicycle wheel. However if the wheel is not rotating faster than the drive input, the wheel is driven by the drive input. This type of overrunning clutch is provided with a one-way or overriding clutch when driving the wheel in a first direction; and a hydraulically actuated friction clutch when driving the wheel in the opposite direction. As such, this clutch overruns in the first direction and is locked to the drive input in the second direction.

The two auxiliary overrunning clutches only overrun in the clockwise or forward direction. Therefore they are locked by the hydraulically actuated friction clutch when operating in the counterclockwise or reverse direction. The two main overrunning clutches only overrun in the counterclockwise or reverse direction. As such they are locked by the friction clutch when the crawler is being driven forward.

The operation of the hydraulically actuated friction clutch can be controlled by the hydraulic valve directing hydraulic pressure to the friction clutches in response to the positioning of the direction selector for the transmission. As illustrated in FIG. 2, a source of hydraulic pressure such as pump 80 directs hydraulic fluid to two-position spring biassed solenoid valves 82 and 84 through hydraulic supply line 86. Valve 82 directs fluid to and from auxiliary overrunning clutches 40 through supply-return line 88. Valve 84 directs fluid to and from main overrunning clutches 38 and two speed gear box 48 through supply-return lines 90 and 92 respectively.

In FIG. 2 the crawler is being driven forward. As such hydraulic pressure is applied to the main overrunning clutches 38 through valve 84 to actuate the friction clutch. In addition, auxiliary overrunning clutches 40 are hydraulically coupled to sump 94 by valve 82 through return line 96. Valves 82 and 84 are oppositely arranged so that when both are deenergized, as illustrated in FIG. 2, valve 82 couples auxiliary overrunning clutches to sump 94; and valve 84 couples pump 80 to main overrunning clutches 38. Similarly when both valves are energized, valve 82 couples pump 80 to auxiliary overrunning clutches 40; and valve 84 couples main overrunning clutches to sump 94.

Valves 82 and 84 are selectively energized by direction sensor switch 98 that selectively couples a source of electrical power 100 to the valves. Direction sensor 98 could be located in the direction selector lever so that movement of the lever from forward-to-reverse would close sensor switch 98; and movement of the lever from reverse-to-forward would open sensor switch 98.

Valve 84 also directs fluid to and from two-speed gearbox 48 by hydraulic line 92. As such the two-speed gearbox is shifted hydraulically whenever the direction sensor switch is closed or opened. In this way the two-speed gearbox can be operated in conjunction with the overrunning clutches.

It should be noted that main steering system 28 and auxiliary steering system 46 are operatively coupled together. In steering the crawler it is necessary that left drive inputs 34 and 42 and the right drive inputs 36 and 44 are paired together. Direction sensor 98 and the associated hydraulic circuitry illustrated in FIG. 2, would operate satisfactory on a crawler that makes skid turns, where there is no counter-rotation of the tracks. However, in crawlers having the ability to spin turn, where the tracks counter-rotate, the left overrunning clutches and the right overrunning clutches would have to be on separate hydraulic circuits and two direction sensors would be required for each side to ensure that the overrunning clutches are correctly manipulated.

FIGS. 3a and 3c disclose the operation of the crawler 30 drive assembly when it is being driven forward. In FIG. 3a there is no slip between the belted track and the main drive wheels propelling the crawler. The first output of the transmission is being driven at a first speed designated as 100%. As the main overrunning clutches are locked this is transmitted to the main drive wheels which are being driven at 100%. The main drive wheels in turn drive the belted track at 100%. The two-speed gear box has reduced the second transmission output to drive the auxiliary wheels at 98% the speed of the main drive wheels. Therefore the drive input to the auxiliary overrunning clutches is 98%. As the auxiliary overrunning clutches are not locked, the auxiliary drive wheel is free to rotate faster than the drive input. Therefore the auxiliary drive wheels are driven at the same speed of the main drive wheel as it fictionally engages the belted track.

When there is slippage between the main drive wheel and the track, the track maybe driven at 98% the speed of the main drive wheel. In such a situation the auxiliary drive input to the auxiliary overrunning clutch is transmitted to the auxiliary wheel, driving the auxiliary drive wheel at 98%. As such the belted track is driven at 98%; or until sufficient traction is restored between the belted track and the main drive wheel so that the auxiliary drive wheel is being driven faster than 98% by the belted track.

FIGS. 3b and 3d show operation of the drive assembly in reverse. FIG. 3b is the no slip condition. As the crawler is being driven in reverse the auxiliary overrunning clutches are locked and the main overrunning clutches are released. In addition, the two-speed gear box is shifted from driving the auxiliary drive wheels from 98% to 102% the speed of the main drive wheels. In the no-slip condition the auxiliary drive wheel is driven at 102% by the two-speed gear box. The auxiliary drive wheels thereby drive the track at 102%. As the main overrunning clutch is released, the main drive wheel is driven at 102% by the belted track.

If slippage occurs between the auxiliary drive wheel and the belted track, the main drive wheel is driven at 100% by the main drive input. The belted track in turn is driven at 100% until sufficient traction is established between the auxiliary drive wheel and the belted track to drive the track at greater than 100% and thereby have the main drive wheel overrun the main drive input.

In the discussion above the examples given were 98% and 102% the speed of the main drive wheel. However, it should be noted that these were examples and different speed percentages maybe selected.

Second Embodiment

The second embodiment is illustrated in FIG. 4 and operates in a manner similar to the first embodiment. The two-speed gear box has been replaced by left and right auxiliary two-speed final drives 50 and 52. Final drives 50 and 52 may be similar to the two-speed final drives disclosed in U.S. Pat. No. 2,240,534, which is incorporated herein by reference. This final drive has a high speed connection and a low speed connection for driving a crawler drive sprocket. The different speed connections are selectively controlled by hydraulically actuated clutches.

Auxiliary drive shaft 32, auxiliary steering system 46 and left and right drive shafts 42 and 44 have been eliminated and replaced with two right angle gear boxes 54 and 56 that drive auxiliary drive shafts 58. The right angle gear boxes have two outputs: the first output drives main wheels 22 through overrunning clutches 38; and the second output drives final drive units 50 and 52 through auxiliary drive shafts 58. The final drives are operatively coupled to auxiliary driven wheels 24. Auxiliary steering system can be eliminated, as the mechanical drive inputs into the final drives is taken off downstream of main steering system 28.

As with the first embodiment, the hydraulic pressure supplied to the final drives may be triggered by a direction sensor switch 98. Hydraulic fluid would be directed to and from final drives 50 and 52 through supply-return line 92 as dictated by the positioning of valve 84.

Third Embodiment

Figure 5:
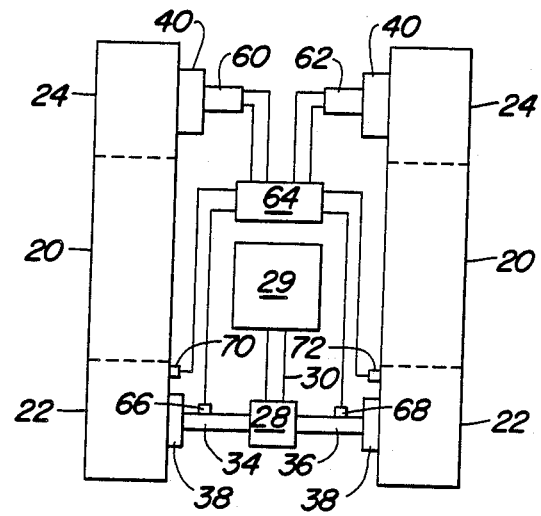
FIG. 5 is a schematic of the third embodiment of the invention.

The third embodiment is illustrated in FIG. 5. With this embodiment the auxiliary drive wheels are driven by left and right electric motors 60 and 62. The electric motors are coupled to the auxiliary drive wheels through overrunning clutches 40. The motors themselves are electrically coupled to a generator (not shown) which supplies electric power to the motors. The generator is turned by the internal combustion engine 17.

The speed of the electric motors is controlled by a controller 64 which may comprise a small programmable computer such as a microcomputer. The controller is provided with left and right wheel speed sensors 66 and 68 which sense the speed of the main drive wheels 22. In addition, the controller would be coupled to direction sensor switch 98 for determining the operating direction of the crawler. As with the embodiment in FIG. 2, supply-return lines 88 and 90 would direct hydraulic fluid to and from overrunning clutches 40 and 38, respectively. However, supply-return line 92 would be eliminated.

If the direction selector sensor signals the controller that the crawler is driving forward, the controller drives electric motors 60 and 62 at 98% the speed of the main drive wheels. The overrunning clutches as before in a no slip condition allow the auxiliary wheels to rotate at the same speed as the main drive wheels, as illustrated in FIG. 3a. With sufficient slippage the electric motors start driving the auxiliary drive wheels at 98% the speed of the main drive wheel, thereby driving the belted tracks.

Similarly when the direction selector sensor signals the controller that the crawler is being driven in reverse, the controller drives the electric motors counterclockwise at 102% the speed of the main drive wheels. As the main drive wheels are also provided with overrunning clutches the crawler operates the same as discussed above with regards to the first embodiment.

With the above described electric drive system the auxiliary drive wheels are continually driven as long as the system is actuated. One possible modification of the system would be the inclusion of left and right track speed sensors 70 and 72 which would be used to signal the controller as to the speed of the track. With this modification the electric motors can be triggered only when slippage is actually detected between the main drive wheel and the belted track. The controller would compare the speed of the main drive wheels to the speed of the track and when the track speed decreases a fixed percentage below the speed of the main drive wheels the electric motors would be triggered.

With this modification the electric motors would not have to be operated at a constant speed ratio to the main drive wheel, but the controller could provide a variable speed profile in driving the auxiliary drive wheels. For example the speed of the electric motors may first be controlled so that they are driven at 98% the speed of the main drive wheels, but after some time this may jump to 99% the speed of the main drive wheels.

With the electric controller system the auxiliary wheel speed sensors maybe used to provide a closed loop control system for controlling motor speed by the controller. In addition, the auxiliary steering system is eliminated as the electric motors can be individually driven by controller 64.

The first two embodiments are mechanical auxiliary drive systems, whereas the third embodiment is an electric drive system. All three embodiments drive the front auxiliary drive wheels at a speed slower than the main rear drive wheels, when driving the crawler forward; and drive the front auxiliary drive wheels faster than the main rear driving wheels when driving the crawler in reverse. Such a configuration provides a good track tensioning profile, by maintaining maximum tension on the lower portion of the belt.

The invention should not be limited by the above-described embodiments, but should be limited solely by the claims that follow.

I claim:

1. A crawler vehicle comprising:
   a frame;
   a power unit secured to the frame;
   a main drive wheel connected to the frame;
   an auxiliary drive wheel connected to the frame;
   an endless belted track operatively engaging both drive wheels for propelling said vehicle;
   a transmission operatively coupling the power unit to the main drive wheel for driving the main drive wheel at a first speed; and
   means for driving the auxiliary drive wheel at a second speed that is different than the first speed.

2. A crawler vehicle as defined by claim 1 wherein the means for driving the auxiliary drive wheel comprises a gearbox having an input that is operatively coupled to the transmission and an output that is operatively coupled to the auxiliary drive wheel.

3. A crawler vehicle as defined by claim 1 wherein the auxiliary drive wheel is provided with an auxiliary overrunning clutch operatively positioned between the auxiliary drive wheel and the gearbox output.

4. A crawler vehicle as defined by claim 3 wherein the main drive wheel is provided with a main overrunning clutch operatively positioned between the main drive wheel and the transmission.

5. A crawler vehicle as defined by claim 4 wherein the main overrunning clutch is locked when the belted track is driven in a first direction and is permitted to overrun when the belted track is driven in an opposite direction.

6. A crawler vehicle as defined by claim 5 wherein the auxiliary overrunning clutch is locked when the belted track is driven in the opposite direction and permitted to overrun when the belted track is driven in the first direction.

7. A crawler vehicle as defined by claim 6 further comprising a direction sensor for detecting the operating direction of said vehicle, the direction sensor is operatively coupled to the overrunning clutches for locking the overrunning clutches in response to the detected operating direction.

8. A crawler vehicle as defined by claim 2 wherein the gearbox has two speeds.

9. A crawler vehicle as defined by claim 8 further comprising a direction sensor for detecting the operating direction of said vehicle, the direction sensor is operatively coupled to the gearbox for switching the speed of the gearbox in response to the operating direction of said vehicle.

10. A crawler vehicle as defined by claim 1 wherein the means for driving the auxiliary drive wheel comprises a final drive unit being operatively coupled to an auxiliary drive wheel.

11. A crawler vehicle as defined by claim 10 wherein the auxiliary drive wheel is provided with an overrunning clutch operatively positioned between the auxiliary drive wheel and the final drive unit.

12. A crawler vehicle as defined by claim 11 wherein the main drive wheel has an overrunning clutch operatively positioned between the main drive wheel and the transmission.

13. A crawler vehicle as defined by claim 12 wherein the final drive unit has two speeds.

14. A crawler vehicle as defined by claim 13 further comprising a direction sensor for detecting the operating direction of said vehicle, the direction sensor is operatively coupled to the final drive unit for switching the speed of the final drive unit in response to the operating direction of said vehicle.

15. A crawler vehicle as defined by claim 1 wherein the means for driving the auxiliary drive wheel comprises an electric motor.

16. A crawler vehicle as defined by claim 15 wherein the auxiliary drive wheel is provided with an overrunning clutch operatively positioned between the electric motor and the auxiliary drive wheel.

17. A crawler vehicle as defined by claim 16 further comprising a controller having a sensor for sensing the first speed of the main drive wheel, the controller is electrically coupled to the electric motor for driving the electric motor at the second speed.

18. A crawler vehicle as defined by claim 17 wherein the main drive wheel is provided with a overrunning clutch.

19. A crawler vehicle as defined by claim 18 wherein the controller is provided with a belt speed sensor which detects the speed of the belt, the controller compares the speed of the main drive wheel and the speed of the belt and drives the electric motor when slippage between the main drive wheel and the belt is detected.

20. A crawler vehicle comprising:
a frame;
an engine secured to the frame;
a pair of main drive wheels connected to opposite sides of the frame;
a pair of auxiliary drive wheels connected to opposite sides of the frame, each of the auxiliary drive wheels are longitudinally aligned with a corresponding main drive wheel;
a transmission for operatively coupling the engine to the main drive wheels for propelling said vehicle; and
means for driving the auxiliary drive wheels at a second speed that is different from the first speed.

21. A crawler vehicle as defined by claim 20 wherein the means for driving the auxiliary drive wheels comprises a gear box having an input that is operatively coupled to the transmission and an output that is operatively coupled to the auxiliary drive wheels.

22. A crawler vehicle as defined by claim 21 wherein each auxiliary drive wheel is provided with an overrunning clutch operatively positioned between the auxiliary drive wheel and the gearbox output.

23. A crawler vehicle as defined by claim 22 wherein each main drive wheel is provided with an overrunning clutch operatively positioned between the main drive wheel and the transmission.

24. A crawler vehicle as defined by claim 23 wherein the gearbox has two speeds.

25. A crawler vehicle as defined by claim 24 further comprising a direction sensor for detecting the operating direction of said vehicle, the direction sensor is operatively coupled to the gearbox for switching the speed of the gearbox in response to the operating direction of said vehicle.

26. A crawler vehicle as defined by claim 20 wherein the means for driving the auxiliary drive wheels comprises two final drive units each being operatively coupled to an auxiliary drive wheel.

27. A crawler vehicle as defined by claim 26 wherein each auxiliary drive wheel is provided with an overrunning clutch operatively positioned between the auxiliary drive wheel and its corresponding final drive unit.

28. A crawler vehicle as defined by claim 27 wherein each main drive wheel has an overrunning clutch operatively positioned between the main drive wheel and the transmission.

29. A crawler vehicle as defined by claim 28 wherein each final drive unit has two speeds.

30. A crawler vehicle as defined by claim 29 further comprising a direction sensor for detecting the operating direction of said vehicle, the direction sensor is operatively coupled to the final drive units for switching the speed of the final drive units in response to the operating direction of said vehicle.

31. A crawler vehicle as defined by claim 20 wherein the means for driving the auxiliary drive wheels comprises two electric motors each motor being associated one of the auxiliary drive wheels.

32. A crawler vehicle as defined by claim 31 wherein each auxiliary drive wheel is provided with an overrunning clutch operatively positioned between the electric motor and the auxiliary drive wheel.

33. A crawler vehicle as defined by claim 32 wherein each of the main drive wheels are provided with overrunning clutches operatively positioned between the transmission and the main drive wheel.

34. A crawler vehicle as defined by claim 33 further comprising a controller having a sensor for sensing the first speed of the main drive wheels, the controller is electrically coupled to the electric motor for driving the electric motor at a second speed.

35. A crawler vehicle as defined by claim 34 wherein the controller is provided with a belt speed sensor which detects the speed of the belt, the controller compares the speed of the main drive wheel with the speed of the belt and drives the electric motor when slippage between the main drive wheels and the belt is detected.

* * * * *